Figure 1:
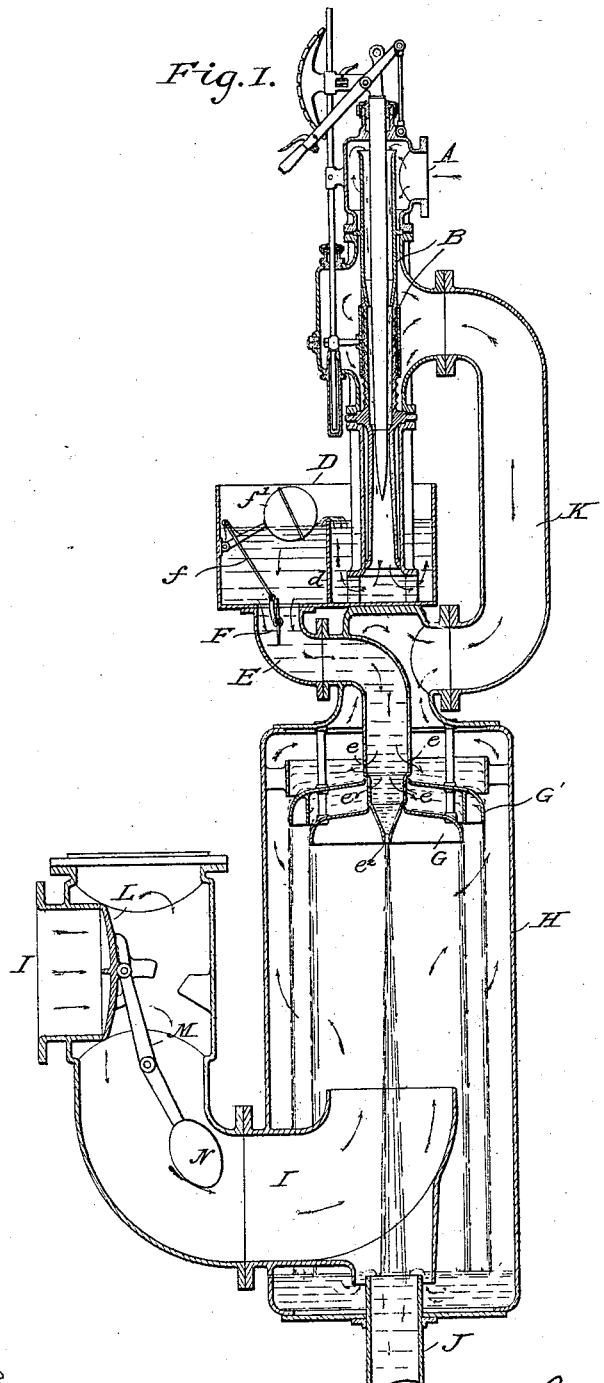

(No Model.) 2 Sheets—Sheet 1.

L. SCHUTTE.
CONDENSER.

No. 493,123. Patented Mar. 7, 1893.

WITNESSES. INVENTOR.

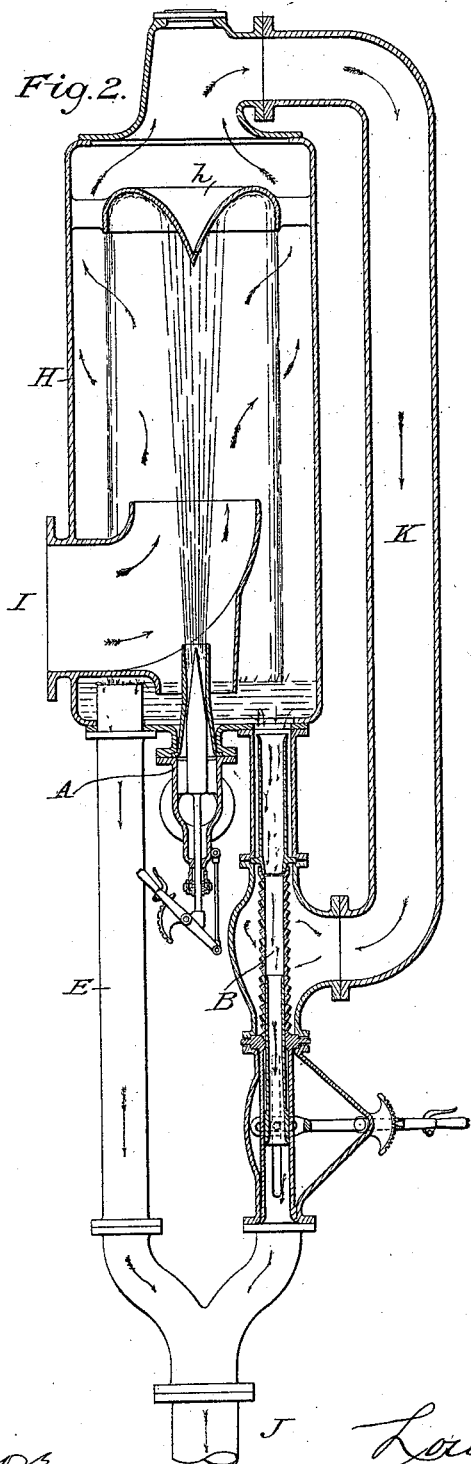

UNITED STATES PATENT OFFICE.

LOUIS SCHUTTE, OF PHILADELPHIA, PENNSYLVANIA.

CONDENSER.

SPECIFICATION forming part of Letters Patent No. 493,123, dated March 7, 1893.

Application filed July 12, 1892. Serial No. 439,804. (No model.)

*To all whom it may concern:*

Be it known that I, LOUIS SCHUTTE, of Philadelphia, county of Philadelphia, and State of Pennsylvania, have invented a new and useful Improvement in Condensers, of which the following is a specification.

This invention has reference to what are commonly known as induction condensers. That is to say, condensers in which a current of water is induced by the action of the vapors or water under pressure, and applied to act as an air pump.

The object of the invention is to adapt the condenser to establish and maintain an extremely high pressure, such as demanded in connection with vacuum pans, or in connection with engines of the compound type, working at extremely low pressures. For this purpose the condensing surface must be increased far beyond the ordinary practice in induction condensers.

In order to obtain the desired result, I adapt my apparatus for the production of a spray or sheet of water in a chamber or passage communicating with the condenser proper, so that when the remaining vapors and permanent gases reach the induction condenser, which acts as an exhauster as well as a condenser, both the vapors and the permanent gases are removed. The water, flowing through the induction condenser at a high velocity mingles with and discharges the gases and vapors by mechanical contact, at a temperature higher than would otherwise be possible.

Referring to the accompanying drawings: Figure 1 represents a vertical central cross-section through a condenser, in accordance with my invention. Fig. 2 a like view of the condenser in an alternative or equivalent form.

Referring to Fig. 1 A represents a water inlet leading to the induction condenser B, which consists as usual of a tube or series of nozzles provided with a series of openings leading from the exterior to the interior, with an inclination forward in the direction of delivery, these openings serving to admit the steam or vapor from the surrounding chamber into contact with the water jet passing through the center. The condenser in the form shown is essentially the same as that described in various Letters Patent heretofore granted to me. At its lower or delivering end, which has the usual expanded mouth, the condenser discharges into a tank D containing a partition $d$ by which water is maintained at a level above the mouth of the condenser. The surplus water flowing over the partition $d$ accumulates in the opposite end of the tank, from which it is discharged at intervals through a pipe E leading from the bottom. This pipe contains a valve F, of the butterfly type or of any other suitable form, for the purpose of preventing the leakage of air into the pipe after the water is discharged from the tank. In the present instance the valve is connected by an operating rod $f$ with a float $f'$ in the tank. When the tank is filled to the level of the partition, the float opens the valve and permits the escape of water; and as the level of the water falls, the float again closes the valve just before the tank is emptied. The pipe E is encircled at its delivery end by annular flanges or plates G and G', and is provided with openings $e$, through which the water escapes in order that it may flow downward over the plates and fall from their outer edges in the form of spray or thin sheets. The plates G are located in the top of the tall chamber H, into the base of which the steam or other vapor to be condensed is delivered through pipe I. At its base the chamber H is provided with a water discharge pipe J projecting upward above the bottom of the chamber and entering an annular mouth $i$ on the under side of pipe I. This arrangement permits the water of condensation to escape at the base, while at the same time a fluid seal is provided to prevent the entrance of air. The pipe E is provided at its lower end with a small opening $e^2$, the purpose of which is mainly to permit the escape of sedimentary matters, although it serves also to permit the escape of a jet of water, which assists in effecting the condensation. From the top of the chamber H a pipe K is extended upward to a chamber surrounding the condenser B.

When the apparatus is in operation, the vapor from the engine or other source, entering through the pipe I through the chamber H, is first subjected to the influence of the spray falling therethrough, the spray being of diminishing temperature toward the top of the chamber. As the chamber H is subjected constantly, through the pipe K, to the exhausting influences of the condenser proper, the vapors which reach the top of the chamber H, pass through the pipe K, and thence inward through the inlets of the condenser B into contact with the water jet passing therethrough, and are delivered through the condenser. The discharge pipe K should be of a length of thirty-four feet or more, in order to insure a positive discharge of the water under the highest possible vacuum.

Referring to Fig. 2 I represents the pipe through which the steam is delivered into the lower end of the chamber H in an upward direction, this chamber being provided at the top with a baffle-plate $h$. At the base of the chamber there is a water supply pipe A having a delivery nozzle extended in an upward direction, for the purpose of projecting the water upward through the chamber and against the baffle-plate, by which the steam is broken up and caused to fall back through the chamber in the form of spray, thereby condensing the greater portion of the vapor. The water of condensation accumulating in the base of the chamber H escapes mainly through the induction condenser B, and thence through the pipe J. The condenser proper, which is of the same general character as that in the first figure and of a form now well known in the art, communicates through pipe K with the top of the chamber H, so that the vapors which are not condensed by the direct action of the water in the chamber H, are drawn downward through the pipe K into the condenser B and delivered therethrough. From the bottom of the chamber H a water discharge pipe E is extended downward to the pipe J, for the purpose of carrying away any surplus of water beyond the amount which can pass through the condenser B. The pipe E has its end projected upward into the chamber H as shown, so that water is at all times maintained at a suitable level above the opening to the condenser proper. It will be observed that in this second form of condenser, the final vapors do not meet the coldest water in the induction condenser as in Fig. 1 but on the contrary first meet the water which has been raised in temperature in the chamber H. One advantage of the arrangement shown in Fig. 2 is that the induction condenser has the direct benefit of the column of water in the tail pipe J, which, as in the first instance, should be thirty-four feet in length.

In the first form of apparatus, I prefer an inwardly opening check valve L at the mouth of the steam inlet pipe I. This check valve is carried by a lever M, having a counter weight N at the lower end, whereby the valve is nearly balanced and caused to move easily. The valve serves to prevent an overflow of water into the steam pipe when starting the apparatus.

While I have represented herein the induction condensers of the preferred forms, it will be understood that I may substitute any other equivalent forms of induction condensers in the place of those shown. It will also be understood that the details of construction and arrangement may be variously modified, provided only that the essential feature of the invention, a spraying water or condensing apparatus, is used in connection with an induction condenser.

Having thus described my invention, what I claim is—

1. In a condensing apparatus the combination of an induction pipe or passage, a spraying chamber having a vapor inlet, and an exhaust pipe or passage leading from the spraying chamber and communicating with the induction pipe.

2. In a condensing apparatus the combination of an induction pipe or passage adapted to be connected with a water supply, a spraying chamber connected with the induction pipe to receive water therefrom, and having a vapor inlet, and an exhaust pipe or passage leading from the spraying chamber and communicating with the induction pipe.

3. In a condensing apparatus the combination of an induction pipe or passage, a spraying chamber having a vapor inlet, a tank or reservoir into which the induction pipe projects and discharges, and which in turn discharges into the spraying chamber, and an exhaust pipe or passage leading from the spraying chamber and communicating with the induction pipe.

4. In a condensing apparatus the combination of an induction pipe or passage, a spraying chamber having a vapor inlet, a tank or reservoir into which the induction pipe projects and discharges, an outlet passage leading from said tank to the spraying chamber, a float valve controlling said passage, and an exhaust pipe or passage leading from the spraying chamber and communicating with the induction pipe.

5. In a condensing apparatus the combination of the induction pipe, the spraying chamber connected therewith, and having an inlet passage near the bottom and an outlet at the top, a water supply opening into the chamber, means for spreading or spraying the water and a suction pipe leading from the spraying chamber to the induction pipe.

6. In a condensing apparatus, the combination of the induction pipe, the spraying chamber connected therewith, a water supply opening into the spraying chamber, means for spreading or spraying the water within the chamber, and the suction pipe connecting the spraying chamber with the induction pipe.

In testimony whereof I hereunto set my hand, this 26th day of May, 1892, in the presence of two attesting witnesses.

LOUIS SCHUTTE.

Witnesses:
DANIEL WATSON HILDRETH,
JOSEPH MOTTASHAW FOREMAN.